United States Patent [19]

Nelson

[11] Patent Number: 4,619,158
[45] Date of Patent: Oct. 28, 1986

[54] BALANCED STEERABLE TRANSMISSION

[76] Inventor: Donald F. Nelson, 7560 Kentwood Ct., Gilroy, Calif. 95020

[21] Appl. No.: 463,479

[22] Filed: Feb. 3, 1983

Related U.S. Application Data

[63] Continuation of Ser. No. 153,177, May 27, 1980, abandoned.

[51] Int. Cl.⁴ ............................................. F16H 37/08
[52] U.S. Cl. ....................................... 74/695; 74/682; 74/694; 74/710
[58] Field of Search ................ 74/695, 665 K, 665 M, 74/665 L, 705, 674, 665 P, 750 R, 710, 664, 665 R, 740, 380, 385, 417, 797, 799, 682; 440/75, 57, 900, 58; 415/122 R; 416/170 R

[56]  References Cited

U.S. PATENT DOCUMENTS

| | | | |
|---|---|---|---|
| 1,300,118 | 4/1919 | Carter et al. | 74/710 |
| 1,382,289 | 6/1921 | Janicki | 74/695 |
| 1,384,839 | 7/1921 | Krohn | 74/695 |
| 1,537,434 | 5/1925 | Gould | 74/695 |
| 1,903,350 | 4/1933 | Landrum | 440/75 |
| 1,954,686 | 4/1934 | Stickney | 74/695 |
| 2,149,320 | 3/1939 | Szekely | 74/682 |
| 2,755,765 | 7/1956 | Wanzer | 74/385 |
| 2,783,661 | 3/1957 | Dryer | 74/695 |
| 3,094,967 | 6/1963 | Willis | 74/682 |
| 3,486,478 | 12/1969 | Halliday | 115/35 |
| 3,492,966 | 2/1970 | Kiekhaeffer | 440/75 |
| 3,750,616 | 8/1973 | Nelson | 115/35 R |
| 3,851,614 | 12/1974 | Nelson | 115/35 |

FOREIGN PATENT DOCUMENTS

| | | | |
|---|---|---|---|
| 1023337 | 1/1958 | Fed. Rep. of Germany | 74/695 |
| 806628 | 9/1936 | France | 74/799 |
| 859573 | 6/1940 | France | 74/710 |
| 1007488 | 6/1952 | France | 74/695 |
| 2356061 | 12/1975 | France | 74/750 R |

*Primary Examiner*—Kenneth J. Dorner
*Assistant Examiner*—Dwight G. Dighl
*Attorney, Agent, or Firm*—Christie, Parker & Hale

[57] ABSTRACT

This power transmission has a steerable yoke mounted for pivoting about an axis coaxial with an input or output shaft. The steerable yoke can be pivoted in either direction with equal torque regardless of rotation of the shaft. Two balanced drive trains interconnect the input and output of the transmission. Each drive train includes a ring gear, a planetary gear and a sun gear. The two planetary gears are interconnected by a spider which is free to pivot and compensate for motion of the steerable yoke. The spider assures that advance of one planetary gear drive equals recession of the other planetary gear drive. Since the two drive trains are equivalent and contra-rotating, torques are balanced.

4 Claims, 5 Drawing Figures

BALANCED STEERABLE TRANSMISSION

CROSS REFERENCE TO RELATED APPLICATIONS

This is a continuation of application Ser. No. 153,177, filed May 27, 1980 now abandoned.

FIELD OF THIS INVENTION

This invention concerns a power transmission having a steerable yoke independent of the input and output drives which have power trains which permit steering the yoke in either direction with equal torque.

BACKGROUND OF THE INVENTION

This invention comprises an improvement over balanced steerable power transmissions disclosed in my U.S. Pat. Nos. 3,750,616 and 3,851,614.

In the steerable transmissions of the above-identified patents there are input and output shafts with the output shaft mounted in a housing which is steerable. This permits the direction of the output shaft to be changed independently of the direction of the input shaft. Such an arrangement can be used, for example, for steering a boat, thereby gaining benefits of both an inboard and an outboard arrangement. These transmissions can be somewhat cumbersome and have appreciable drag since a large housing is rotated.

It is desirable to provide an arrangement where the transmission housing is essentially fixed and a steerable yoke or the like can be pivoted about an axis coaxial with the output shaft. This permits a relatively smaller structure to be pivoted. It is desirable that the yoke be steerable with substantially no net torque; that is, with essentially the same torque required to pivot the yoke in either direction, regardless of the direction or speed of rotation of the output shaft.

This not only makes the steerable transmission quite suitable for use in small boats, it can significantly increase the fields in which the transmission is useful. It can be employed in land and air vehicles, construction equipment, wind generators, and a broad variety of other applications limited only by the ingenuity of the user.

BRIEF SUMMARY OF THE INVENTION

There is, therefore, provided in practice of this invention according to a presently preferred embodiment a balanced steerable power transmission having a stationary housing and input and output shafts through which power is transmitted. A steerable sleeve or yoke is mounted concentric with what can be considered the output shaft. There is a first drive train coupling the input shaft to the output shaft. A second drive train couples the input shaft to the yoke. The output shaft is also coupled to the yoke in equal magnitude and opposite sense to the coupling of the second drive train to the yoke so that there is no net rotational force on the yoke due to the drive trains when the input shaft is rotatably driven; that is, the yoke can be steered or pivoted in either direction with equal torque regardless of rotation of the shafts.

BRIEF DESCRIPTION OF THE DRAWINGS

These and other features and advantages of the present invention will be appreciated as the same becomes better understood by reference to the following detailed description when considered in connection with the accompanying drawings wherein.

DETAILED DESCRIPTION

Figure 1:
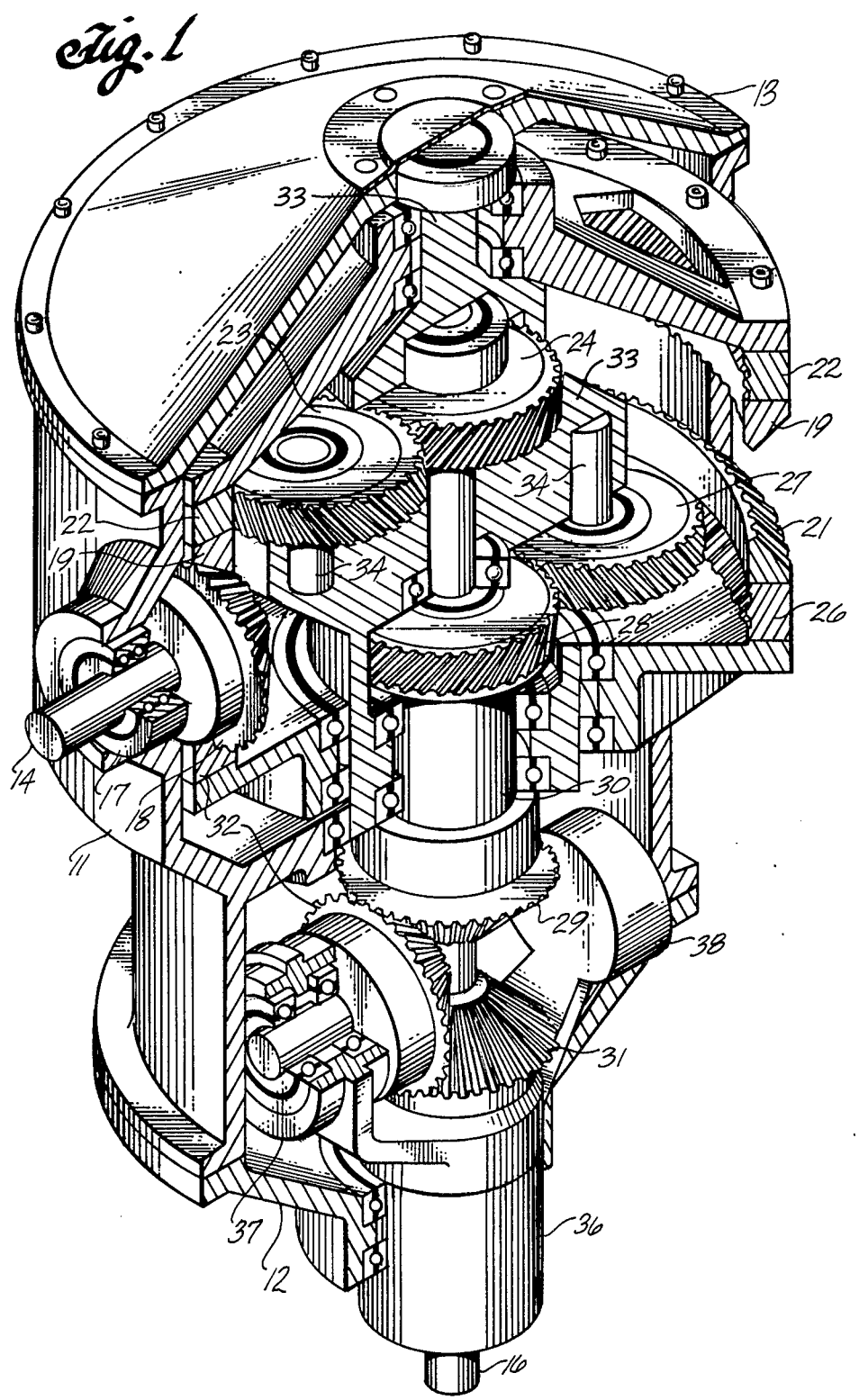
FIG. 1 illustrates in slightly schematic perspective cutaway a balanced steerable transmission consturcted according to principles of this invention.
Figure 2:
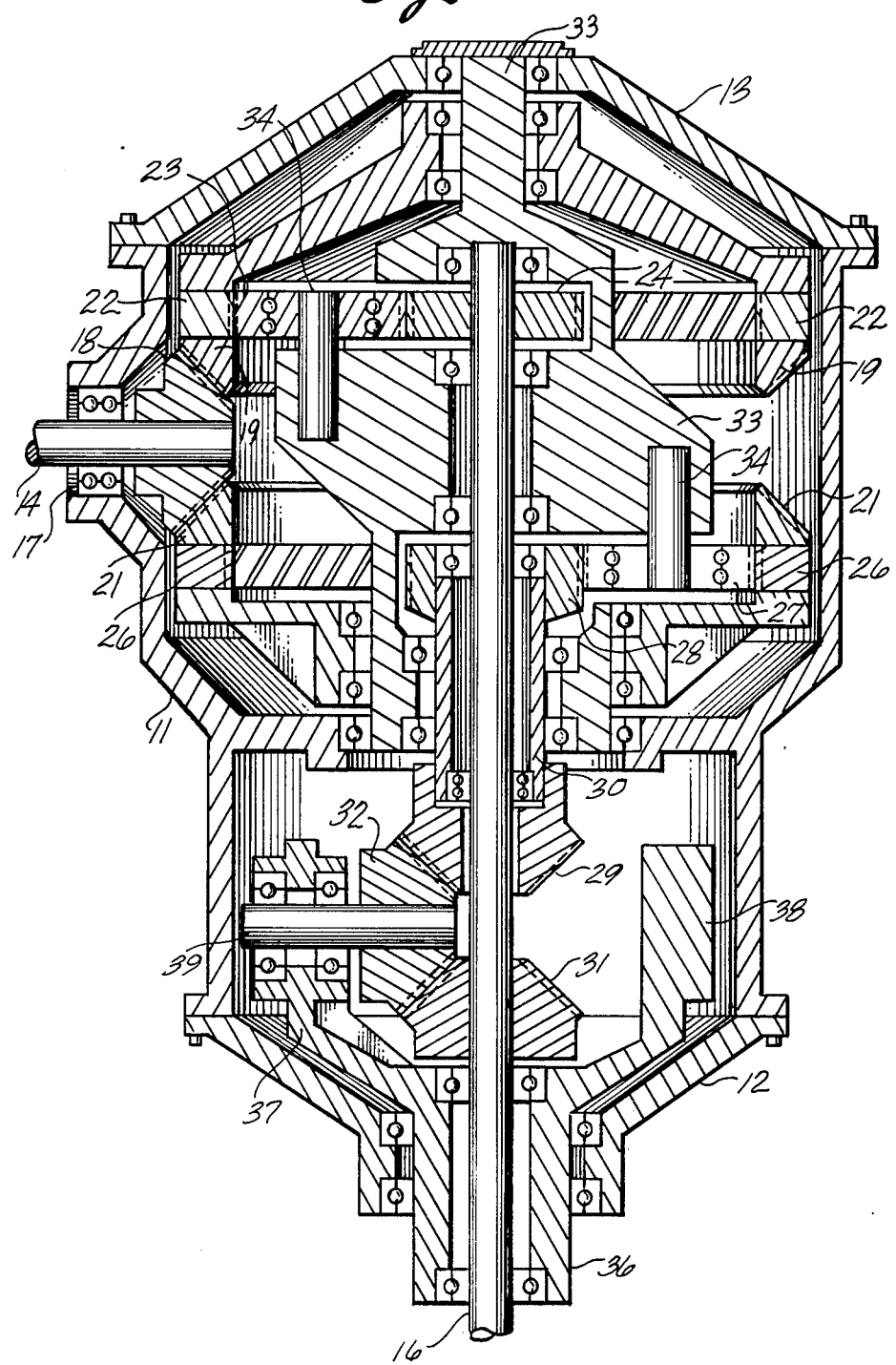
FIG. 2 is a slightly schematic longitudinal cross section through the transmission.

One embodiment of the balanced steerable power transmission is illustrated slightly schematically in the longitudinal cross-section of FIG. 2, and in a perspective view with portions of the housing and internal mechanisms cut away in FIG. 1. As illustrated in these views, the housing of the transmission comprises a main casing 11 closed at the bottom by a lower cover 12 and at the top by an upper cover 13. An input shaft 14 enters one side of the main casing 11. An output shaft 16 extends through the lower cover 12 coaxial with the housing of the power transmission which is essentially circular in transverse cross section. The output axis is perpendicular to the input axis.

As used herein, the designations of top and bottom of the transmission are used with respect to the drawings in FIGS. 1 and 2. This is done for convenience in the description and there is no relation to the orientation of the transmission in service. In practice the transmission can be oriented in any direction.

Also for convenience in description, one of the shafts 14 is referred to as the input shaft and the other shaft 16 is called the output shaft. These roles can be reversed with power applied to the "output" shaft and a driven member connected to the "input" shaft. Thus, within this specification and accompanying claims, "input," "output," "upper," "lower," and the like are employed for clarifying the members referred to and are not words of limitation. Throughout, "input" could be read "output" and vice versa.

The input shaft 14 is journalled in the main casing 11 by ball bearings 17 or the like. Various other members in the transmission are also mounted by ball bearings indicated schematically in the drawings and, in general, these are not further referred to in this description since conventional in nature. It will also be apparent that grease seals and the like are employed at the openings through which shafts pass. Various bolts, snap rings, and similar conventional devices have also been omitted from the drawings for clarity.

An input bevel gear 18 is fixed on the input shaft 14. The input bevel gear meshes with an upper bevel ring gear 19 and a lower bevel ring gear 21, both of which are coaxial with the output shaft 16. Because of meshing with opposite sides of the input bevel gear, the ring gears are driven in contra-rotation.

The upper bevel ring gear is secured to an upper helical ring gear 22. The upper helical ring gear meshes with an upper planetary gear 23 which also meshes with an output sun gear 24 secured on the output shaft 16. Thus, input torque is coupled from the input shaft to the output shaft by way of the input bevel gear 18, upper bevel ring gear 19, upper helical ring gear 22, upper planetary gear 23, and output sun gear 24.

The lower bevel ring gear 21 is secured to a lower helical ring gear 26. The lower helical ring gear meshes with a lower planetary gear 27, which in turn meshes with a transfer sun gear 28 coaxial with the output shaft. The transfer sun gear is secured to a transfer bevel gear 29 by a sleeve 30. This transfer gear assembly is coaxial with the output shaft 16 and journalled on that shaft for rotation separate from rotation of the output shaft.

An output bevel gear 31 is secured on the output shaft 16 opposite the transfer bevel gear 29. A common bevel gear 32 meshes with both the transfer bevel gear 29 and the output bevel gear 31. The transfer bevel gear and output bevel gear rotate in opposite senses of rotation. The common bevel gear reverses the sense of rotation of the output shaft and output sun gear.

Thus, power is also coupled from the input shaft to the output shaft by a second drive train. This drive train comprises, seriatim, the input bevel gear 18, the lower bevel ring gear 21, the lower helical ring gear 26, the lower planetary gear 27, the transfer sun gear 28, the transfer bevel gear 29, the common bevel gear 32, and the output bevel gear 31 secured on the output shaft.

A spider 33 is mounted in the housing for pivoting about an axis coaxial with the output shaft. For ease of understanding in the drawings, the spider is illustrated as if it were a single integral member. It will be understood, however, that the spider is assembled from a plurality of components which permit machining and assembly of the components. Suggestive of this assembly from component parts is the illustration of shafts 34 pressed into the main body of the spider to provide journals for the upper and lower planetary gears 23 and 27. The complex geometry of the spider is no disadvantage since it does not rotate at substantial speed, and precise balance is therefore unnecessary.

The spider 33 is journalled in the main casing 11 and cover 12 for pivoting coaxial with the output shaft. The spider in turn provides journalling support for the upper and lower ring gears and journalling support that stiffens the output shaft. The principal purpose of the spider, however, is to provide journalling support for the upper and lower planetary gears which are mounted on opposite faces of the spider and on diametrically opposite sides of the output shaft. The axes of rotation of the planetary gears are parallel to the output axis. The spider assures that the two planetary gears precess together within the respective helical ring gears.

A steerable or pivotable sleeve 36 is journalled in the lower cover 12 coaxial with the output shaft. The sleeve 36 comprises a Y-shaped yoke having a gear mounting arm 37 and a counterbalance arm 38. The common bevel gear 32 is mounted on a shaft 39 journalled in the gear mounting arm for rotation about an axis normal to the axis of the output shaft. If desired, a second common bevel gear can be mounted on the yoke in lieu of the counterbalance arm for engaging the output bevel gear and the transfer bevel gear. Such an arrangement balances thrust as well as weight.

The steerable yoke 36 can be pivoted in either a clockwise or counterclockwise sense relative to the housing independently of rotation of the output shaft. The two drive trains couple the input shaft to the output shaft so that there is no net rotation force on the yoke due to the drive trains as the input shaft is rotatably driven; that is, the steerable sleeve can be pivoted in either sense with equal torque regardless of input and output shaft rotation. The balancing of the torques in opposite directions is accomplished by precession of the spider in coordination with pivoting of the steerable sleeve and contra-rotation of the planetary gear systems.

Assume that the steerable sleeve is pivoted so that the left side in the illustration of FIG. 2 comprising the gear mounting arm 37 tends to move out of the plane of the drawing and the right side comprising the counter-balance arm 38 tends to move into the plane of the drawing. Assume further that for an instant the input and output shafts and the drive trains therebetween are stationary. Pivoting of the sleeve would therefore tend to move the common bevel gear 32 out of the plane of the drawing and because of gear meshing would tend to rotate the transfer gear assembly with its left side coming out of the plane and the right side receding into the plane of the drawing.

To accommodate rotation of the transfer gear assembly the face of the lower planetary gear 27 is engagement with the transfer sun gear 28 also tends to recede into the plane of the drawing. Since the ring gear 26 is considered stationary, the entire rotational axis of the lower planetary gear tends to recede into the plane of the drawing. This, of course, is fixed to the spider 33 and makes the rotational axis of the upper planetary gear 23 tend to move out of the plane of the drawing. The spider thus coordinates precession of the planetary gears. The torque required to pivot the steerable sleeve and spider is equal in either sense of rotation since the two ring gears 22 and 26 are rotating in opposite directions as are the corresponding sun gears 24 and 28. In effect, one planetary gear drive recedes by an amount equal to advance of the other planetary gear drive in response to pivoting of the steerable yoke.

Figure 3:
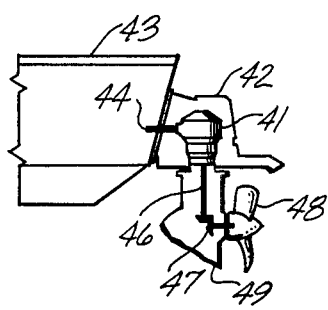
FIG. 3 is a fragmentary view indicating application of a steerable transmission in an inboard-outboard arrangement for a boat.

FIG. 3 is a fragmentary view illustrating an application of the balanced steerable transmission in an inboard-outboard boat arrangement. In this embodiment the transmission 41 is mounted in a housing 42 on the transom of a boat 43. The input shaft 44 to the transmission is connected to an inboard motor (not shown). The output shaft 46 is connected by way of a pair of bevel gears 47 to the propeller 48 for driving the boat. The propeller is mounted on a streamlined housing 49 connected to the steerable yoke of the transmission. Thus, the streamlined housing and propeller can be pivoted as desired for driving and steering the boat. Since the power transmission is balanced as hereinabove described, pivoting of the housing in either direction requires equal force.

Figure 4:
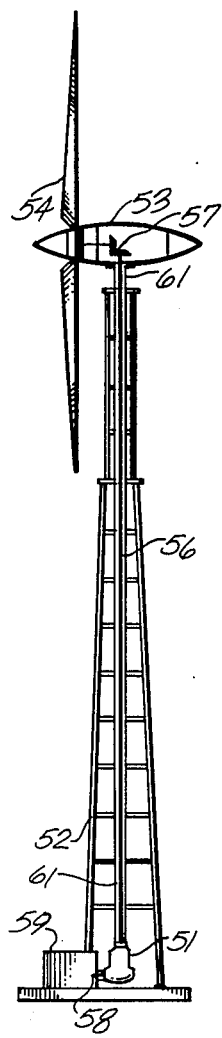
FIG. 4 illustrates application of a steerable transmission in a wind generator.

FIG. 4 illustrates another application of a balanced steerable transmission indicating the equivalence of the "input" and "output" shafts insofar as which of the two shafts is driven and which one provides the driving force. In this embodiment, what has been designated the "output" shaft for purposes of exposition is driven, whereas what has been designated the "input" shaft does the driving.

FIG. 4 is a semi-schematic view of a wind generator incorporating a balanced steerable transmission 51. The transmission is at the base of a tower 52 on top of which is pivotally mounted a hub assembly 53. A large diameter propeller 54 is mounted on the hub to be driven by the wind. The propeller is connected to the "output" shaft 56 of the transmission by bevel gears 57. The "input" shaft 58 of the transmission is connected to an electric generator 59.

To generate electricity by the wind generator, it is desirable to keep the propeller aligned into the wind. The hub assembly 53 is therefore connected to the steerable yoke 61 of the transmission. In this embodiment the yoke 61 comprises an elongated tube running the height of the tower. Thus, the tube can pivot to maintain the hub assembly and propeller properly aligned with the wind direction, either in response to automatic weathervaning or a driven control system, and the torque required to turn the hub in either direction is equal regardless of propeller rotation.

Figure 5:
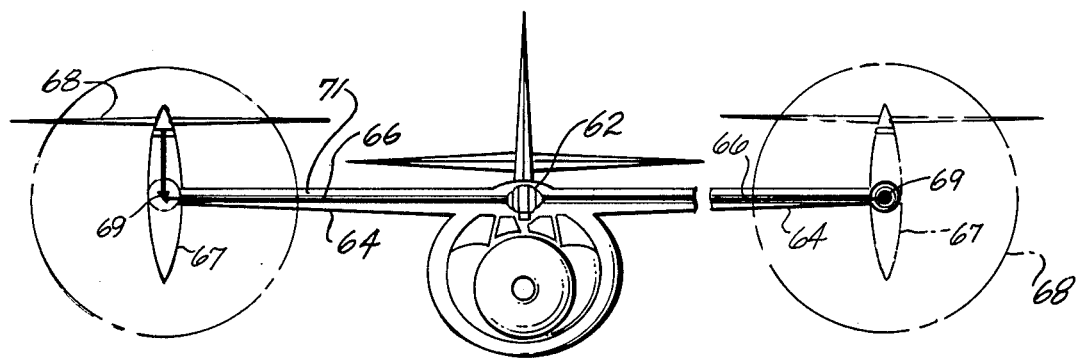
FIG. 5 illustrates application of a steerable transmission in a VTOL airplane.

FIG. 5 illustrates another application of a balanced steerable transmission as provided in practice of this invention. In this embodiment a transmission is employed in a vertical take-off and landing (VTOL) aircraft. A balanced transmission 62 is mounted in the fuselage of the airplane in line with the wings 64. The input to the transmission is fed by a power plant (not shown) in the fuselage of the aircraft. Two output shafts 66 extend from the transmission along the length of the wings. The transmission is essentially a pair of the transmissions hereinabove described and illustrated.

A pod 67 is mounted on the end of each wing 64. Each pod mounts a propeller 68 for driving the aircraft. In FIG. 5 the starboard pod is illustrated with its axis extending vertically so that the propeller can provide direct lift for the aircraft for take-off or landing. The port pod is illustrated with its axis extending horizontally so that the propeller drives the aircraft in its normal flight mode. The alternate positions of the pods and propellers are indicated in phantom.

Each of the output shafts 66 is connected to a propeller by bevel gears 69 in the pod so that the propeller is driven by the power plant in the fuselage. This permits use of a relatively small diameter pod at the wing tip. A tube 71 around each shaft connects the steerable sleeve of the transmission with one of the pods 67 for pivoting the pod between the horizontal and vertical positions. Each of the pods can be pivoted between such positions independently.

Many other applications of the balanced steerable power transmission will be apparent to those skilled in the art. Thus, for example, the power transmission can be mounted on a land vehicle with the output shaft and steerable sleeve extending vertical at each of a plurality of wheels. The wheels can then be steered by pivoting the steerable sleeve. Power can be applied to the wheels by way of the output shaft and all of the input shafts of such transmissions can be driven from a single power plant. Such an arrangement can be employed, for example, in an all-terrain vehicle where all four wheels are driven and are steerable.

Many other adaptations, modifications and variations of the balanced steerable transmission will be apparent. Thus, for example, an output shaft can extend through each end of the transmission. Such an arrangement can be used in a VTOL aircraft such as illustrated in FIG. 5. Alternatively, plural input bevel gears can be employed in engagement with the upper and lower bevel ring gears for providing a plurality of driven shafts from a transmission powered by a driven output shaft.

In the illustrated embodiment the steerable yoke connects to a sleeve coaxial with the output shaft. Another embodiment can have a Y-shaped yoke extending laterally from the transmission but pivotable about the output axis. A variety of other steerable yoke or sleeve arrangements can also be employed.

Use of plural planetary gears in each planetary gear system and other changes in the internal gearing will also be apparent. Many other modifications and variations will be apparent to one skilled in the art and it is to be understood that the scope of the invention is defined by the following claims.

What is claimed is:

1. A balanced steerable power transmission comprising:
   an input shaft;
   an output shaft;
   a steerable yoke pivotable about an axis coaxial with the output shaft;
   a first drive train comprising a first ring gear coupled to the input shaft and to a first planetary gear, the first planetary gear being coupled to a first sun gear connected directly to the output shaft for coupling the input shaft to the output shaft;
   gear means carried by the steerable yoke;
   means for coupling the output shaft to the gear means carried by the yoke;
   a second drive train comprising a second ring gear coupled to the input shaft and to a second planetary gear, the second planetary gear being coupled to a second sun gear, the second sun gear being coupled to the gear means on the yoke for coupling the input shaft to the gear means in equal magnitude and opposite sense to the coupling of the first drive train to the output shaft so that there is no net rotational force on the steerable yoke in response to rotation of the input and output shafts; and
   a pivotable spider interconnecting said first and second planetary gears for coordinating precession of said planetary gears.

2. A balanced steerable power transmission comprising:
   an input shaft;
   an output shaft;
   a steerable yoke pivotable about an axis coaxial with the output shaft;
   a first drive train coupling the input shaft to the output shaft;
   common gear means carried by the steerable yoke with the shaft of the common gear journalled on the yoke;
   means for coupling the output shaft to the common gear means;
   a second drive train coupling the input shaft to the common gear means in equal magnitude and opposite sense to the coupling of the first drive train to the output shaft so that there is no net rotational force on the steerable yoke in response to rotation of the shafts; wherein
   the first drive train comprises a first ring gear, a first sun gear directly coupled to the output shaft and coaxial with the first ring gear and the output shaft, and a first planetary gear in engagement with the first ring gear and with the first sun gear;
   the second drive train comprises a second ring gear coaxial with the first ring gear indirectly coupled through the common gear means to the output shaft, and a second planetary gear in engagement with the second ring gear and with the second sun gear; and further comprising
   a spider interconnecting the first and second planetary gears including means for mounting said planetary gears for rotation relative to the spider;

means for mounting the spider for rotation coaxial with said ring gears; and
means for coupling the input shaft to said ring gears for rotation of said ring gears in opposite directions.

3. A transmission as recited in claim 2 comprising a first bevel gear connected to the output shaft, a second bevel gear connected to the second sun gear and coaxial with the first bevel gear, and wherein the common gear means comprises a common idler bevel gear carried by said yoke with the shaft journalled in said yoke and the common idler gear engaging with the first bevel gear and with the second bevel gear.

4. A balanced steerable power transmission comprising:
  a stationary housing;
  an input shaft in the housing mounted for rotation about an input axis;
  an output shaft in the housing mounted for rotation about an output axis perpendicular to the input axis;
  a first ring gear coaxial with the output axis;
  a second ring gear coaxial with the output axis;
  an input bevel gear connected to the input shaft and coupled to the first and second ring gears for contra-rotating the first and second ring gears;
  a first sun gear connected to the output shaft;
  a first planetary gear intercoupling the first ring gear and the first sun gear;
  a second sun gear coaxial with the output axis;
  a second planetary gear intercoupling the second ring gear and the second sun gear;
  a spider interconnecting the first and second planetary gears including means for mounting the planetary gears for rotation about axes parallel to the output axis;
  a transfer bevel gear connected to the second sun gear;
  an output bevel gear connected to the output shaft;
  a steerable yoke pivotable about the output axis;
  a common bevel gear intercoupling the transfer bevel gear and output bevel gear; and
  means for mounting the common bevel gear on the steerable yoke for rotation about an axis normal to the output axis.

* * * * *